(12) United States Patent
Zappi et al.

(10) Patent No.: US 7,638,314 B2
(45) Date of Patent: Dec. 29, 2009

(54) PRODUCTION OF BIODIESEL AND OTHER VALUABLE CHEMICALS FROM WASTEWATER TREATMENT PLANT SLUDGES

(75) Inventors: Mark E. Zappi, Starkville, MS (US); William Todd French, Starkville, MS (US); Rafael Hernandez, Starkville, MS (US); Stephen Thomas Dufreche, Ponchatoula, LA (US); Darrell L. Sparks, Jr., Cordova, TN (US)

(73) Assignee: Mississippi State University, Mississippi State, MS (US)

( * ) Notice: Subject to any disclaimer, the term of this patent is extended or adjusted under 35 U.S.C. 154(b) by 157 days.

(21) Appl. No.: 10/956,069

(22) Filed: Oct. 4, 2004

(65) Prior Publication Data

US 2005/0112735 A1    May 26, 2005

Related U.S. Application Data

(60) Provisional application No. 60/507,698, filed on Oct. 2, 2003.

(51) Int. Cl.
  C12P 5/00    (2006.01)
  C12P 7/64    (2006.01)
  C12P 7/08    (2006.01)

(52) U.S. Cl. .................. 435/134; 435/163; 435/166; 424/283.1

(58) Field of Classification Search .............. 435/134, 435/163, 166; 424/283.1
See application file for complete search history.

(56) References Cited

U.S. PATENT DOCUMENTS

| | | |
|---|---|---|
| 4,118,281 A | 10/1978 | Yan |
| 4,119,495 A | 10/1978 | Belyaev |
| 4,344,770 A | 8/1982 | Capener |
| 4,618,735 A | 10/1986 | Bridle et al. |
| 4,624,417 A | 11/1986 | Gangi |
| 4,678,860 A | 7/1987 | Kuester |
| 4,728,517 A | 3/1988 | Markham et al. |
| 4,781,796 A | 11/1988 | Bridle et al. |
| 4,828,577 A | 5/1989 | Markham et al. |
| 5,082,534 A | 1/1992 | Breu |
| 5,098,584 A | 3/1992 | Leen |
| 5,294,553 A | 3/1994 | Kawahara |
| 5,482,528 A | 1/1996 | Angell et al. |
| 5,525,126 A | 6/1996 | Basu et al. |
| 5,558,686 A | 9/1996 | Lavelle |
| 5,658,462 A | 8/1997 | Hopkins et al. |
| 5,681,449 A | 10/1997 | Yokoyama et al. |
| 5,707,673 A | 1/1998 | Prevost et al. |
| 5,711,768 A | 1/1998 | Schulz |
| 5,713,965 A | 2/1998 | Foglia et al. |
| 5,846,425 A * | 12/1998 | Whiteman ............ 210/606 |
| 5,847,248 A | 12/1998 | Bridle et al. |
| 5,853,590 A | 12/1998 | Burnham |
| 5,922,536 A | 7/1999 | Nivens et al. |
| 5,980,754 A | 11/1999 | Hopkins et al. |
| 5,989,587 A | 11/1999 | Sprott et al. |
| 6,013,183 A | 1/2000 | Stephenson et al. |
| 6,077,548 A | 6/2000 | Lasseur et al. |
| 6,084,091 A | 7/2000 | Muller et al. |
| 6,132,625 A | 10/2000 | Moffett |
| 6,166,231 A | 12/2000 | Hoeksema |
| 6,174,501 B1 | 1/2001 | Noureddini |
| 6,197,081 B1 * | 3/2001 | Schmidt ..................... 71/1 |
| 6,350,890 B1 | 2/2002 | Kiy |
| 6,398,707 B1 | 6/2002 | Wu et al. |
| 6,399,800 B1 | 6/2002 | Haas et al. |
| 6,440,057 B1 | 8/2002 | Ergun et al. |
| 6,506,223 B2 | 1/2003 | White |
| 6,727,373 B2 | 4/2004 | Bijl et al. |
| 2002/0124613 A1 | 9/2002 | Sower |
| 2002/0156305 A1 | 10/2002 | Turck |
| 2002/0162332 A1 | 11/2002 | Hazlebeck |
| 2003/0015476 A1 | 1/2003 | Moffett |
| 2003/0032826 A1 | 2/2003 | Hanna |

(Continued)

FOREIGN PATENT DOCUMENTS

DE    2812193 A1    10/1978

(Continued)

OTHER PUBLICATIONS http://www.lipidlibrary.co.uk/mainlip.html, (as printed on Mar. 24, 2005).
http://www.mycustompak.com/healthNotes/Supp/Fish_Oil.html, "Fish Oil and Cod Liver Oil (EPA and DHA)", Vitamin Guide (2003).
http://turva.me.tut.fi/iloagri/stock/8.html, "Manure and Waste Handling" by Popendorf (2003).

(Continued)

Primary Examiner—Ruth A Davis
(74) Attorney, Agent, or Firm—Lawrence Arthur Schemmel (57) ABSTRACT

A process for producing biodiesel has been invented by first extracting lipids from the sludges generated during primary and/or biological treatment of municipal, agricultural, and industrial wastewaters using primary, secondary, and tertiary treatments followed by the transesterification of the extracted lipids using transesterification conversion into alcohol-based esters. The resulting products from this process include biodiesel, glycerol, lipid-free proteins, various other useful chemicals and an aqueous-based substrate well suited for optimized digestion within subsequent biological digestion (either aerobic or anaerobic). The lipids extracted from the sludges containing high levels of microorganisms are phospholipids which can also be directly used as lecithin. The extraction of the lipids from the sludges will be performed using chemical extraction techniques with the transesterification of the extracted lipids accomplished using basic, acidic, and/or a combination of the two transesterification techniques.

15 Claims, 3 Drawing Sheets

U.S. PATENT DOCUMENTS

| | | | |
|---|---|---|---|
| 2003/0083512 A1 | 5/2003 | Jakel et al. | |
| 2003/0111410 A1 | 6/2003 | Branson | |
| 2003/0149289 A1 | 8/2003 | Suppes | |
| 2003/0167681 A1 | 9/2003 | Delgado Puche | |
| 2003/0172697 A1 | 9/2003 | Sower | |
| 2003/0175182 A1 | 9/2003 | Teall et al. | |

FOREIGN PATENT DOCUMENTS

| | | | |
|---|---|---|---|
| DE | 10043644 | | 3/2002 |
| EP | 1331260 | | 7/2003 |
| JP | 2000270886 | | 10/2000 |
| WO | WO 00-05327 | * | 2/2000 |
| WO | WO03051803 | | 6/2003 |

OTHER PUBLICATIONS http://www.wsu.edu/~gmhyde/433_web_pages/433Oil-web-pages/rapeseed2/rape-canola-oil.html, "Oilseed Extraction-Rapeseed Oil" by Perry, Roche, Sherley, and Tiede (2003).

http://www.wsu.edu/~gmhyde/433_web_pages?433Oil-web-pages/Soybean Oil, "Soybean Oil", by Semon, Patterson, Wyborney, Blumfield, and Tageant (2004).

http://www.mindfully.org/Air/2003/Burn-Turkey-Waste-Energy16may03.html, "Changing World Technologies Wants to Burn Turkey Waste for Energy" by Bergstrom (2003).

http://www.cleanairfleets.org/altfuels.html, Clean Air Fleets, "Alternatives to Conventional No. 2 Diesel Fuel", (2003).

http://www.me.iastate.edu/biodiesel/Pages/biol.html, "What is Biodiesel and What It is Not", by Ingram et al., Iowa State University, J. Biotech., vol. 15, pp. 855-868 (1999).

http://www.mdac.state.ms.ua/Library/AlternativeEnergy/Biodiesel.html, Mississippi Department of Agriculture and Commerce (MDAC) (2003).

http://msucares.com/crops/corn/index.html "Crops: Corn Current Situation", Mississippi Agricultural and Forestry Experiment Station, Mississippi State University (2003).

http://nbb.org/pdf_files/CommonlyAsked.pdf, "Commonly Asked Questions", National Biodiesel Board (2003).

http://nbb.org/pdf_files/Production.pdf,"Biodiesel Production", National Biodiesel Board (2003).

ASTM, "Standard Specification for Biodiesel Fuel (B100) Blend Stock for Distillate Fuels", ASTM, West Conshohocken, PA, Spec. No. ASTM D 6751-02 (YEAR).

Alcantara, et al., "Catalytic Production of Biodiesel From Soy-Bean Oil, Used Frying Oil, and Tallow", Biomass and Bioenergy, vol. 18, pp. 515-527 (2000).

Boocock et al., "Fast One-Phase Oil-Rich Processes For the Preparation of Vegetable Oil Methyl Esters", Biomass and Bioenergy, vol. 11, No. 1, pp. 43-50 (1996).

Braum, Introduction to Organic and Biological Chemistry, Third Edition, MacMillian Publ, New York, NY, ISBN: 0-02-306640-7 (1982).

Canakci et al., "Biodiesel Production From Oils and Fats With High Free Fatty Acids", Transactions of the American Society of Agricultural Engineers, vol. 44, No. 6, pp. 1429-1436 (2001).

Chemical Market Reporter, "US Biodiesel Sees More Production in New Plants", Sep. 16, 2002.

Cheremisinoff, Liquid Filtration—Second Edition, BH Publishing, Boston, MA, ISBN: 0-7506-7047-9 (1998).

David, M. et al., "Glycerol: A Jack of All Trades", The Chemistry Hall of Fame, York University, Toronto, Ontario (1996).

Davis, Andrews, and Al-Kaisi, "Liquid Manure Management", Colorado State University Cooperative Extension Service, Ft. Collins, CO, No. 1.221 (2004).

Demirbas, "Supercritical Fluid Extraction and Chemicals From Biomass With Supercritical Fluids", Energy Conversion and Management, vol. 42, pp. 279-294 (2001).

Dickinson and Meyers, "Solexol Fractional of Menhaden Oil", The Journal of the American Oil Chemists' Society, vol. 29, No. 6 (1952).

Donovan Associates (C.T.) Inc., "The Availability of No- to Low-Cost Feedstocks for Biodiesel and Ethanol in Philadelphia", Final Report submitted to the Northeast Regional Biomass Program, Washington, DC (1998).

Dunn, R., "Biodiesel Jet Fuels", Agricultural Research, Jul. 2001 issue.

Freedman et al., "Variables Affecting the Yields of Fatty Esters From Transesterified Vegetable Oils", Journal of the American Oil Chemists' Society, vol. 61, No. 10, pp. 1638-1643 (1984).

Fulhage, "Reduce Environmental Problems With Proper Land Application of Animal Manure", University of Missouri-Columbia, MU Extension Service, Report No. EQ 201 (2000).

Geiselman, "Dems Urge New Ship Sewage Limits", Waste News, Apr. 12, 2004.

Hammer and Hammer, Water and Wastewater Technology, Prentice-Hall, Englewoods Cliff, NJ, ISBN: 0-13-205626-7 (1996).

Henry et al., "What is an Anaerobic Digester?", Issued in furtherance of Cooperative Extension work, Acts of May 8 and Jun. 30, 1914.

Higman and van der Burgt, "Gasification", Elsevier Pub., Boston, MS, ISBN: 0-7506-7707-4 (2003).

Jenkins, Richard, and Daigger, Manual on Causes and Control Activated Sludge Bulking Foaming of the Solids Separation Problems, Third Edition, Lewis Pub., Baco Raton, FL, ISBN: 1-5667-0647-5 (2003).

Johnson, "Handling Manure a Chore Unto Itself", Waste News, Sep. 29, 2003.

Jones and Sutton, "Design and Operation of Livestock Waste Lagoons", Purdue University Cooperative Extension Service, West Lafayette, IN (2003).

Kalam and Masjuki, "Biodiesel From Palmoil—an Analysis of Its Properties and Potential", Biomass and Bioenergy, vol. 23, pp. 471-479 (2002).

Korane, "Designing Diesels for the Next Decade", Machine Design, Sep. 18, 2003.

Kuhad et al., "Microorganisms as an Alternative Source of Protein", Nutrition Reviews, vol. 55 No. 3, pp. 65-75 (1997).

Lee et al., "Extraction of Grape Seed Oil by Supercritical Carbon Dioxide and Ethanol Modifier", Journal of Food Science and Biotechnology, vol. 9, No. 3, pp. 174-178 (2000).

Leggett, Lanyon, and Graves, "Biological Manipulation of Manure: Getting What You Want From Animal Manure", Penn State Agricultural and Biological Engineering Extension Service, University Park, PA (1996).

Lusk, "Methane Recovery From Animal Manures: The Current Opportunities Casebook", National Renewable Energy Laboratory, Golden CO, U.S. Dept. Of Energy, Report No. NREL/SR-580-25145 (1998).

Ma and Hanna, "Biodiesel Production: A Review", Bioresource Technology, vol. 70, pp. 1-15 (1999).

Mermelstein, "Spray Drying", Food Technology, vol. 55, No. 4, Apr. 2001.

McCormick and Parish, Advanced Petroleum Based Fuels Program and Renewable Diesel Program—Milestone Report: Technical Barriers to the Use of Ethanol in Diesel Fuel, Report No. MP-540-32674, NREL, Golden, CO (2001).

McMurry, J., Organic Chemistry, 5$^{th}$ Edition, Brooks/Cole, Pacific Grove, p. 1120 (2000).

Metcalf and Eddy, Wastewater Engineering: Treatment, Disposal, and Reuse—Third Edition, McGraw-Hill Inc., New York, NY, ISBN: 0-07-041690-7 (1991).

Miyamoto, "Renewable biological systems for alternative sustainable energy production (FAO Agricultural Services Bulletin—128)", (1987).

O'Brien, R.D., Fats and Oils: Formulating and Processing For Applications, Technomic Publishing Company, Lancaster, PA (1998).

Pearl, G., "Animal Fat Potential For Bioenergy Use", Presented at Bioenergy Conference, Boise, ID, Sep. 22-26, 2002.

Perera et al., "Feed Consumption, Growth and Growth Efficiency of Rainbow Trout (Oncorhynchus Mykiss (Walbayum)) Fed On Diets Containing a Bacterial Single-Cell Protein", Britain Journal of Nutrition, Cambridge University Press, vol. 73, No. 4, pp. 591-603 (1995).

Perrut, Clavier, Poletto, and Reverchon, "Mathematical Modeling of Sunflower Seed Extraction by Supercritical Carbon Dioxide", Industrial Engineering Chemical Research, vol. 36, pp. 430-435 (1997).

Peterson et al., "Continuous Flow Biodiesel Production", Applied Engineering in Agriculture, vol. 18, No. 1, pp. 5-11 (2002).

Pretorius, "A Conceptual Basis for Microbial Selection in Biological Wastewater Treatment", Wat. Res., vol. 21, No. 8, pp. 891-894 (1987).

Rice et al., "Bio-Diesel Production Based on Waste Cooking Oil: Promotion of the Establishment of an Industry in Ireland", Final Report for the Agricultural and Food Development Agency (Contract No. XVII/4.1030/77/95/IRL) (1997).

Salunkhe et al., "World Oilseeds: Chemistry, Technology, and Utilization", Van Nostrand Reinhold, New York, NY (1991).

Schuchardt et al., "Transesterification of Vegetable Oils: A Review", Journal of Brazil Chemical Society, vol. 9, No. 1, pp. 199-210 (1998).

Seader and Henley, "Separation Process Principals", John Wiley and Sons, New York, NY, ISBN: 0-471-58626-9 (1998).

Sharp, C., "Characterization of Biodiesel Exhaust Emissions for EPA 211(b)", Prepared for the National Biodiesel Board, Jefferson City, MO (1998).

Sheehan et al., "An Overview of Biodiesel and Petroleum Diesel Life Cycles", DOE National Reviewable Energy Laboratory, Golden CO, Report No. TP-580-24772 (1998).

Shekhar, Kumar, and Mazumdar, "Study of COD and BOD Changes During Anaerobic Digestion of Human Excreta in a Biogas Plant", Indian Journal of Environmental Protection, vol. 11, No. 5, May (1991).

Sincero and Sincero, Environmental Engineering: A Design Approach, Prentice-Hall, Englewoods Cliff, NJ, ISBN: 0-02-410564-3 (1996).

Speece, "Anaerobic Biotechnology for Industrial Wastewaters", Archae Press, Nashville, TN, ISBN: 0-9650226-0-9 (1996).

Steel and McGhee, "Water Supply and Sewerage", McGraw Hill, New York, NY, ISBN: 0-07-060929-2 (1979).

Stephenson R. and Blackwell J., Jr., "The Industrial Wastewater Systems Handbook", CRC Press LLC, Boca Raton, FL, ISBN: 1-56670-209-7 (1998).

Tickwell, "From the Fryer to the Tank: The Complete Guide to Using Vegetable Oil as an Alternative Fuel", Joshua Tickwell Media Productions, New Orleans, LA, ISBN: 0-9707227-0-2 (2003).

Tyson S., "Biodiesel Handling and Use Guidelines", NREL, Golden, CO, Report No. TP-580-30004 (2001).

U.S. Environmental Protection Agency (USEPA), Design Manual: Onsite Wastewater Treatment and Disposal Systems, Report No. EPA-625/1-80-012, USEPA Office of Research and Development, Cincinnati, OH (1980).

U.S. Environmental Protection Agency (USEPA), A Citizen's Guide to Solvent Extraction, Report No. EPA-542-F-96-003, Office of Solid Waste and Emergency Response, Washington, DC (1996).

U.S. Environmental Protection Agency (USEPA), Biosolids Technology Fact Sheet, Report No. EPA-832-F-00-057, USEPA Office of Water, Washington, DC (YEAR).

U.S. Environmental Protection Agency (USEPA), Biosolids Generation, Use, and Disposal in the United States, Report No. EPA/530-R-99-009, Office of Solid Waste and Emergency Response, Washington, DC (1999).

Waterland et al., "Safety and Performance Assessment of Ethanol/Diesel Blends (E-Diesel)", NREL/SR-540-34817, Sep. 2003.

Weber et al., "Cost Implications of Feedstock Combinations for Community Sized Biodiesel Production", Proceedings: First Biomass Conference of the Americas-Energy, Environment, Agriculture, and Industry, vol. 2, pp. 910-915 (1993).

Zappi, Hernandez, Sparks, Horne, and Brough, "A Review of the Engineering Aspects of the Biodiesel Industry", MSU E-TECH Report No. ET-03-003, Environmental Technology Research and Applications Laboratory, Dave C. Swalm School of Chemical Engineering, Mississippi State University, Starkville, MS (YEAR).

Zubkov et al., "Determination of Total Protein of Bacterial Cells by SYPRO Staining and Flow Cytometry", Appl. and Environ. Micro., vol. 65, No. 7, pp. 3251-3257 (1999).

Hass et al., "Biodiesel Research, Presentation given at the Biodiesel Research and Brainstorning Workshop", Jan. 20-30 (2003).

McCormick, et al., "Advanced Petroleum Based Fuels Program and Renewable Diesel Program—Milestone Report: Technical Barriers to the Use of Ethanol in Diesel Fuel", Report No. MP-540-32674, NREL, Golden, CO (2001).

Petersen, et al., "Biodiesel from Yellow Mustard", Department of Transportation, Office of University Research and Education, Final Report (KLK310/N01-25) (2001).

Reynolds and Richards, "Unit Operations and Processes in Environmental Engineering", PWS Publishing Company, Boston, MA, ISBN: 0-534-94884-7 (1996).

Supplementary European Search Report, issued in EU Patent Application No. 04793997.0 dated Mar. 6, 2007.

* cited by examiner

Fatty acids → FAME

FIGURE 3

PRODUCTION OF BIODIESEL AND OTHER VALUABLE CHEMICALS FROM WASTEWATER TREATMENT PLANT SLUDGES

This application claims priority from U.S. Provisional Application Ser. No. 60/507,698 filed Oct. 2, 2003. The entirety of that provisional application is incorporated herein by reference.

BACKGROUND OF THE INVENTION

1. Field of the Invention

This invention involves the production of numerous valuable chemicals using an innovative processing of sludges generated during primary, secondary and/or tertiary treatment of municipal, agricultural, and industrial wastewaters.

The produced chemicals include lipids and biodiesel (a renewable replacement to petroleum-based diesel), lecithin (a commercial nutrient and processing "building-block chemical" typically produced from eggs and soy oil), glycerol (a widely used chemical feedstock in many industrial processes), and a by-product that is much more digestible than typical influents to digestion processes at wastewater plants, due to the removal of the lipid fraction, which in turn will increase the rate and extent of digestion (resulting in greatly reduced sludge residual volumes requiring disposal and an increase in the quality of the resulting digested product).

2. Background of the Technology

The earth contains a wide variety of carbon reservoirs that can be harnessed to meet societal power requirements in the form of gaseous, liquid, and solid fuels, with liquid fuels being of most importance. The modem world has come to rely almost exclusively on fossil-based fuel reserves, a non-renewable resource, for production of liquid fuels. However, the cost and politics of being totally dependent on these reserves is getting progressively more expensive from both a strategic and sociological standpoint. A renewable source of fuels and other chemicals is required for meeting the future energy needs of the United States and the world.

Biodiesel represents an alternative to petroleum-based diesel fuel. Biodiesel is produced from renewable feedstocks. This fully renewable resource is most often produced from oil-yielding plants, such as soybeans and rapeseeds, or animal-based products, such as fats and oils captured during rendering, carcass processing, or recovery from frypits. Chemically speaking, biodiesel is a mixture of mono-alkyl esters of fatty acids, most often obtained from extracted plant oils and/or collected animal fats. The source of these fatty acids is lipids. Lipids are actually a class of chemicals found in plants, animals, microorganisms, and wastes derived from these sources. Lipids are not very soluble in water. Sewage sludge contains high levels of lipids, most often in the form of triglycerides, phospholipids, phosphoglycerides, sphinolipids, glycolipids, and fat-soluble vitamins.

Conversion of the plant oils and animal fats into biodiesel has been undergoing further development/optimization over the past several years. However, the base-catalyzed, methyl-transesterification of soybean oil has been the predominant production technique used within the United States. In Europe, rapeseed is the predominant feedstock used (Environment Canada, 2003; IA State, 2003). Commonly accepted biodiesel feedstocks include the oils from soy, canola, corn, rapeseed, and palm. New plant oils that are under consideration include mustard seed, peanut, sunflower, and cotton seed. In the case of animal fats, this feedstock is often called "yellow" grease. Grease collected from cooking establishments is called "brown" grease; however, this source can be made up of both plant and animal derived triglycerides. The most commonly considered animal fats include those derived from poultry, beef, and pork. The identification of less expensive sources of feedstock that can prove suitable for biodiesel production is very important to the continued expansion of biodiesel production and to less reliance on petroleum based fuels.

Wastewater biological treatment plants all produce waste sludges. In fact, vast quantities of sludges are produced on a daily basis. Ever-tightening environmental regulations, increases in disposal tipping fees, and rampant public resentment against these sludges and the current modes of disposal has placed operators of these facilities in a crisis situation to find novel techniques for managing these sludges. These sludges are composed of and derived from the biodegradation of essentially all liquid and solid matter fed into the treatment plants via the influent. Of key interest to this invention is the fact that lipids make up 2% to over 40% (dry weight basis) of the sludges produced from these treatment plants. Example sludges derived from these processes include primary sludge, grit residuals, skimmings, secondary sludge (waste sludge), sloughed biomass, biosolids, processed biosolids, and manure sludges from confined animal raising facilities. All of these sewage/manure-based sludges contain varying amounts of lipids.

SUMMARY OF THE INVENTION

It has been discovered that by extraction and use of lipids from wastewater treatment sludges, an economic and highly effective feedstock for biodiesel production and other industrial products can be provided. In addition to the production of lipids, this invention provides for the extraction of lipid free proteins and other useful chemicals from sludges associated with wastewater treatment.

Example wastewater treatment systems include municipal wastewater biological treatment plants, industrial biological treatment plants, manure holding facilities from animal raising operations, and biological treatment systems for wastewater treatment at animal raising facilities. All of these waste streams pose environmental threats and their management represents government regulatory and economic challenges to their respective facility operators.

In addition to providing a novel process for extracting useful chemicals from such waste products, the process will serve to reduce environmental threats and offer operators of wastewater producing facilities an unexpected source of income rather than a disposal and possible liability expense from such waste products.

It is therefore an object of this invention to provide a method of extracting lipids from sludges of wastewater facilities for use as a lipid-rich feedstock for biodiesel production and other industrial chemical production. Additionally several other chemicals and products (such as proteins and fertilizers for example) can be produced from these sludges after the lipids have been extracted.

Particularly, it is an object of the present invention to provide a method for producing a lipid-rich feedstock for biodiesel production, which is obtained by lipid extraction from biologically treated wastewater.

More particularly, it is an object of the present invention to provide a method for producing a lipid-rich feedstock for biodiesel production, which is obtained by lipid extraction from all sludges obtained by biologically treated sludges, such as for example sewage sludges.

It is another object of the present invention to provide a method of producing lipid free proteins and lipid-free, post-extraction residuals obtained by treatment of sludges obtained from treatment of wastewater.

It is another object of the present invention to provide a method of producing valuable chemicals such as glycerol, lecithin, ethanolamine, and the like by the claimed processing of sludges obtained from wastewater facilities.

It is another object of the present invention to provide lipids which can be used as feedstocks to many industrial chemicals and fuels.

It is another object of the present invention to provide a method of producing biogas by treatment of sludges, which are rendered easily digested, the sludges being obtained from wastewater treatment facilities.

It is another object of the present invention to provide a method of producing a residual sludge that meets USEPA'S Class A and beneficial use biosolids criteria.

It is another object of the present invention to provide a dried, lipid free sludge remnant that can be used as a feed for a gasifier or combustion system for industrial heat and electrical power production.

It is another object of the present invention to provide a lipid free dried sludge that can be thermally converted into condensable oils or pyrolyzed into biooils.

DETAILED DESCRIPTION OF THE INVENTION

The present invention provides a novel method for the production of a variety of valuable chemicals using an innovative source and associated process for extracting such chemicals from wastewater sludges during the primary, secondary and/or tertiary treatment of municipal, agricultural, and industrial wastewater. While proteins and other valuable chemicals can also be removed from such sludges, a primary interest of the present invention is the removal and processing of lipids from wastewater sludges.

In the production of lipids or other valuable chemicals the source or feedstock, which is used in the production process is of importance. For example, most lipid sources used in conventional processes are natural sources such as soy beans, corn, sunflowers, rapeseed, and the like. Extraction of lipids from other sources, such as wastewater conventionally involve the processing of float material or scum, which are actually made up of captured free oils and fats from industrial water treatment obtained from meat processing or food oriented facilities. Such conventional lipid extraction involves the removal of lipid containing emulsions from the aqueous phase by air floatation or static separation cells. The removal of such oils and greases that are skimmed off the top of the wastewater as a float material or scum or are removed by a process using more oil to "sweep collect" entrapped oils is conventional and not directed to or capable of removing the collection of all lipids contained in the wastewater feedstock.

Unlike such conventional processes, the present invention provides a process for the removal of all lipids from a wide variety of sludges and solids derived from the collection and treatment of municipal, industrial, and animal raising facility wastewaters. The novel process provided includes the biological treatment of wastewater and the use of both solids present in the influent and sludge generated during treatment, which is generated from municipal, industrial, and agricultural activities.

Conventional processes involving the use of wastewater sludges as a feedstock are directed to the removal of only those lipids found in the float material or scum of various wastewater feedstocks or are directed to thermal processes that chemically alter and degrade the chemicals contained in the sludges and solids derived from the collection and treatment of municipal, industrial, and animal raising facility wastewater. In contrast, the process of the present invention is directed to the separation of all lipids from the sludges and solids derived from the collection and treatment of municipal, industrial, and animal raising facility wastewater. Thus the process of the present invention can extract and make use of the whole lipid component in addition to extracting other useful chemicals from these same sludges and solids.

A general discussion of the processes conventionally employed by a sewage treatment plant is provided below with some annotation provided to assist in the understanding of the process of the present invention.

In the processes of a conventional sewage treatment plant, the influent is collected and delivered to the headworks of the plant where large debris is removed. After removal of the large debris, further processes are carried out on the influent with some process variation depending on the source of the wastewater and the size and capability of the treatment facility.

Collection is the first step in providing a wastewater stream for a treatment facility. For example, sewage is collected from residential and industrial feeders and pumped or gravity flowed into the headworks of the sewage treatment plant.

In the headworks of the plant, the initial process to remove large debris from the influent can typically employ screens to effect such debris removal. The result of this initial screening is a bulky sludge with free oil lipids absorbed onto all types of materials including linen, paper, wood, plastics, large food items and the like.

The wastewater also typically includes a grit component that is next removed using well known grit removal systems. This grit component is conventionally disposed of as an oily grit sludge which contains lipids.

The bulky sludge and the oily grit sludge are two distinct sludges, which are conventionally removed in large scale sewage treatment plants. These two sludges represent only a small fraction of the total solids produced at a municipal waste water treatment plant; however, they can contribute to the total of solids, which by the process of the present invention can yield lipids, proteins, and other valuable chemicals.

A next step in the treatment of wastewater is the primary settling of solids, also conventionally referred to as the primary treatment. This primary treatment is not performed at all wastewater plants. The primary settling of solids involves a settling or filtration step to remove the solids from the influent. This solids fraction, referred to as the primary sludge, is typically obtained by settling or filtration or centrifugation and is composed primarily of food and excrement.

Another sludge that may be produced from this primary treatment step is a float sludge or scum. It usually contains fatty materials, biosurfactants, surfactants, and bioemulsifiers, entrapped water and small solids, which can also be referred to as scum. Hence, two sludges may be produced from this primary treatment of sludge. The primary or settled sludge coming from the bottom of the settler is by far the larger portion by weight of the two sludges produced. The other, much lighter weight portion, is the float sludge or scum, which is collected as a floating foamy material that can be skimmed off the top of the wastewater influent. Conventionally, these two primary treatment-generated sludges are sent on to sludge digestion or disposed in a landfill.

The process of the present invention can include the combining of the float sludge with the primary sludge (the settled bottom sludge). While the present invention can operate using only the primary sludge, the preferred process of the present invention includes using both the float sludge and the primary or settled sludge. In doing so, the present invention can remove the entire lipid component of the sludge.

The primary or settled sludge tends to be heterogeneous in that it contains but is not limited to feces, undigested food, and wasted food particles. The primary sludge is a significant portion of the total sludge weight produced from municipal wastewater plants. It is also within the concept of the invention to include solids that are obtained during the primary treatment using filtration or any other solid separation process not described above, such as, for example centrifugation, drying beds, screening or the like. Thus, the process of the present invention can include using a fraction, any part of the whole of solids, or all of the lipid-containing portion of the influent provided to a wastewater plant. Preferentially, the totality of the solids obtained from the primary treatment step will be used, thus maximizing the lipid component obtainable by the present invention.

During secondary treatment, the liquid portion generated from the primary treatment of plant influents is then passed on to biological treatment. If the treatment plant does not contain a primary treatment step, as discussed above, the influent can be sent directly to biological treatment. During biological treatment, microorganisms (often referred to as biomass) are contacted with the influent, thus permitting the microorganisms to use the carbon in the influent. Aerobic microorganisms can generally be used; however, facultative, anaerobic organisms, yeast, and/or algae can sometimes be used. Process components/equipment that may be used in this step include activated sludge, contact stabilization, sequential batch reactors, lagoons, contact towers, rotating biological contactors, Imhoff Tanks, oxidation ditches, and the like. Most of the carbon (both liquid or solids) in the influent is metabolized by the microorganisms, which produce more microorganisms, chemical by-products of incomplete metabolysis, or untreated solids that may have by-passed treatment.

After biological treatment, in most cases, the resulting solution is sent on to a solids separation step (also referred to as a clarification step) where most of the solids are separated from the water, which at this point is referred to as effluent. During this settling step, two sludges may be produced: a scum sludge and a settled or bottoms sludge. The vast majority of the inputted solids come out in the settled sludge. Most of the settled sludge can be sent back to the biological reactor where it is reused for further treatment of incoming wastes. However, a portion of the settled sludge is disposed of or "wasted" (periodically or continually depending on the treatment plant design and operation). Disposal of this wasted settled sludge serves to prevent overpopulation of bacteria within the biological reactor. The wasted sludge is conventionally referred to as waste sludge or secondary sludge.

In the present invention, the scum and secondary sludge can be combined because both have high levels of lipids. The scum portion includes mostly surfactants, triglycerides and free fatty acids, while the waste sludge contains some triglycerides, but a large amount of phospholipids among other bacterial-based lipids. Both of these sludges are highly heterogeneous in terms of composition because many types of solids are involved, such as, but not limited to, organisms. (bacteria, algae, fungi, archea, and predators, such as ciliates and rotifiers), free lipids, and other solids, such as untreated media (feces, food particles, etc.). Thus, a large variety organisms (most but not all being bacteria) are contained in the biological reactors.

A next step in treatment of the wastewater is digestion. Digestion is a step in the treatment process used to reduce the total tonnage of sludge for which disposal is required. The disposal of sludge is necessary due to the health and environmental problems, which are associated with sludge. In the digestion step the degradation of the sludge is accomplished using biological processes. The most commonly used digestion processes are often categorized as either aerobic digestion (a process where the sludge is degraded by primarily aerobic organisms) or anaerobic digestion (a process where the sludge is degraded by primarily anaerobic organisms). After a certain amount of treatment time, the solids are removed from the aqueous matrix and are disposed of by using a variety of techniques. The solids disposed of or reduced in this process step are commonly referred to as biosolids, sewage sludge, waste solids, or the like. Such solids can be further processed by composting, lime addition, or heating.

In the present invention the removal of lipids and other chemicals, which tend to inhibit digestion, serves to improve the rate and extent of digestion accomplished over conventional processes. Thus, the present invention, in addition to providing valuable lipids, lipid free proteins and other chemicals from the sludge, serves to improve the "digestability" of the remaining sludge. This advantage of the present invention is of great importance in that the disposal of the biosolids remaining from conventional treatment of wastewater is an enormous disposal problem in that there are serious concerns over issues such as degradable organics remaining, hazardous chemicals within the sludge matrix, potential pathogenic properties, and odor generation potential of the remaining sludge. Biosolids from sewage treatment processes are classified based on the potential for pathogens being present after digestion. Class B sludge is a material that has been digested but still must be carefully disposed following strict regulations. In some cases, further processing of Class B biosolids is required to reduce the potential for the presence of pathogens. After this further processing, if certain criteria are met, the biosolids may then be classified as Class A or any beneficial-use sludge biosolids. A designation of biosolids as being Class A or any beneficial-use sludge allows the sludge to be treated as a non-hazardous and non-regulated material of little or no concern.

The present invention is capable of processing any form of the wastewater biosolids, sludges, and solids without regard to the processing steps, which are performed on them. Examples of the further processing of biosolids to attempt to convert the biosolids into a material that can be classified as Class A or a beneficial-use sludge include, for example thermal heating, pH adjustment, pH adjustment combined with heating, radiation, irradiation and the like. Conventionally heating of the biosolids has been widely used.

The present invention does not require the use of the conventional process of thermal processing in which a gas is collected and condensed into an oil. Such processes use high temperatures to volatilize all of the components out of the solids into a gas product that is subsequently condensed into an oil that then can be separated via several condensation steps. This type of processing changes the chemical compositions of the components and actually serves to produce much less bio-oil per dry ton of biosolid than the amount of lipids or biodiesel produced by the process of the present invention.

In the present invention the heating processes, which are used, treat the solids and do not produce a processed gas stream, which typically results from conventional thermal processing methods. Such conventional methods remove the organic compounds from the solids via thermal volatilization, thermal cracking and thermal depolymerization. These processes use high temperature and often high pressures to volatilize the components of the sludges which modifies the chemical composition of the compounds, such that upon subsequent condensation a very different compound results.

As an alternative to the conventional thermal treatment of biosolids discussed above, other conventional treatment plants have attempted using chemical or limited thermal treatments to convert their Class B biosolids to Class A or any beneficial-use sludge biosolids. These pH treating, heating, or combination processes do not volatilize the organic components into gases, which are later condensed, but simply are processes that heat the biosolid or raises the pH (or both) to kill any potential pathogens in the Class B biosolid. Such non-volatilizing treatments are intended to kill pathogenic organisms and thus should be considered a Class A or any beneficial-use sludge. It is possible in the processes of the present invention, that the lipid removal and other valuable chemical removal processes can still be accomplished on these conventionally pH/heat-treated biosolids.

The present invention is thus useful for all sludges that are produced during the biological treatment of industrial wastewaters. Unlike some conventional processes that are limited to light floatation sludge produced during preliminary treatments such as air floatation and separation tank treatments, the present invention can be employed with the recovery of lipids from the bulk of all solids in the wastewater influent and particularly from the heavy solids, which are collected from these treatment processes. These heavy solids provide a very good source of lipids, proteins, and other chemicals using the process of the present invention.

The processes for treatment of Industrial wastewater influent that is produced from a wide range of industrial activities using biological processes can generally be the same process as that described above for the treatment of sewage treatment plant wastewater. As with the influent for sewage treatment plants, some industrial facilities may do some form of "pretreatment." This pretreatment could involve the removal of free oils and greases from industrial influents, which are generated from many food-processing oriented industries such as slaughter houses and cookers. Similar to that described for the preliminary treatment of sewage wastewater, these industrial facilities can typically use air flotation or separation tanks to recover free-product, i.e. oils and greases, in the form of float material or scum. Such preliminarily treated sludges represent the minor part of the available lipid content of such wastewaters. In contrast, the present invention is directed to the recovery of all available lipids and other valuable chemicals; particularly to the recovery of chemicals found in the heavy settled sludges from the pretreatment processes and all of the sludges produced from the biological treatment of industrial wastewaters.

Another source of wastewater influent that can be processed using the method of the present invention is the wastewater stream obtained from confined animal raising husbandry facilities. These facilities are typically animal farms that concentrate the product animals into small areas, which can have any number (500 or more) animals within one or more pens or barns. Examples of such facilities include feedlots, swine houses, poultry operations (layers and broilers), dairy farms, and turkey growers. In such facilities, manure and feed spillage are collected and typically treated using some form of biological treatment. Sources of sludge can include, for example, under-drains of swine parlors, litter, under-cage solids, scrapped solids, lagoon solids, settling basin sludges, bioreactor solids (secondary sludge), and wash-out sludges. The processes of the present invention can be applied to solids in the wastewater influent and sludges generated during treatment of wastewater produced from such facilities in the same manner as earlier described.

Another possible source of wastewater solids and sludges that can be processed for lipid and valuable chemical recovery according to the present invention is septic tank sludges Such sludge is subject to a biological treatment technique in the septic tank and the aggregate of collections from septic tanks can be a valuable source of influent for the process of the present invention. The biological treatment of such wastewater is discussed in detail in Design Manual: Onsite Wastewater Treatment and Disposal Systems by the USEPA (1980), Report No. EPA-625/1-80-012, Office of Research and Development, USEPA, Cincinnati, Ohio, the complete disclosure of which is fully incorporated herein by reference.

The sources of wastewater influent for which the process of the present invention can be used are widely varied but commonly are those, which produce sludge from biological treatment processes and animal raising facilities. Examples of such sludges include: primary sludge, biosolids (Class B), grit, screen material, scum, secondary sludges, composted biosolids, processed secondary sludges, manures (wet and dry), anaerobic digester sludges, processed biosolids (Class A), septic tank sludges, other beneficial use biosolids, PACT process, fluidized beds, land application, and the like.

The composition of such sludges are heterogeneous. Each of the above listed sludges are well-known and commonly accepted within the industry as sludges clearly acknowledged as commodities. The key materials, which make up such sludges include, for example, manure (feces), bacteria (both aerobic and anaerobic), food products, plastics, paper, free oils and greases, archea, surfactants, algae, free proteins, grit, larva, household garbage, grazing multicellular organisms (rotifers, ciliates, amebas, sludge worms, etc.). Such sludges are commonly produced in virtually all municipal wastewater treatment plants and in many industrial plants. Common to all such sludges is the wide variety of organisms found in any one sludge; that is, they are chemically and physically heterogeneous and very unique without any intentionally engineered singular concentration of a single variety of algae, bacteria, or oil/grease scum, etc.

Biological treatment plants where sludge such as those listed above can include those plants associated with, for example: activated sludge, attached growth reactors, oxidation ditches, rotating biological contactors (RBCs), sequential batch reactors (SBRs), Imhoff tanks, trickling filters, biofilters, aerobic lagoons, anaerobic lagoons, contact stabilization, extended aeration, anaerobic digesters, septic tanks, on-site small community package treatment plants, on-site single dwelling biotreatment plant, ship-board grey and black water storage tankage, and ship-board wastewater treatment systems and the like.

In practice of the present invention, all sludges will be collected from wastewater treatment plants and used as a source of lipids, lipid free proteins, and other valuable chemicals. Depending upon the processes used at each individual wastewater treatment plant, the above listed sludges can be collected singularly or as a variety of mixes that combine one or more of the sludge types.

The process of the present invention includes collection of each of the types of sludge produced under any wastewater treatment operational senario singularly or as mixes. Biosolids can preferably be collected and used in the process of the invention separate from all other sludges, which can and likely will be used as a combined-sludge. In the process of the invention, the sludge can be dewatered (partially dehydrated) to form a solid concentration of 5% or greater solids by weight using one or more of the following processing steps: sludge thickeners, filter presses, centrifuges, and driers. After dewatering the more concentrated sludge can be further dried to a final solid concentration ranging from 60% to 100% solids by weight. This further drying can be accomplished by any means but preferably by using commercial driers or sludge drying beds. After the dewatering and possibly drying, lipids can be extracted from the processed material using any of the well-known methods of chemical extraction such as using chemical solvents including aliphatics, supercritical gases and liquids, hexane, acetone, primary alcohols, and the like.

It is within the concept of the invention to extract both the free lipids (oils and grease) as well as the chemically bonded lipids, which are found within the many components of the wastewater sludges (i.e. bacteria, algae, etc.). In addition to using well known processes for extraction of lipids from the biomass, the process of the present invention include cell lyse techniques, such as pressurization via venture necks, pumping, sonication, or chemical lysing means (i.e., via an alcohol and/or ketone) and the like.

The sludges used in the present invention can also be treated by oxidative processing to change the degree of saturation of the lipids contained in the sludges, a result that can increase the market value of the extracted lipids. Such oxidative processing as is known in the art can be employed at any stage of the inventive process and can include treatments such as, for example, ozonation, peroxone oxidation, or use of Finton's Reagent.

The extracted lipids can then be used as an industrial lipid-rich feedstock or can be further processed to produce biodiesel. Below is provided a brief summary of well known examples of methods for the production of biodiesel; Commonly used methods such as, base transesterification, acid esterification, and a combination of thereof have advantages and disadvantages depending upon the feed stock used.

Figure 1:
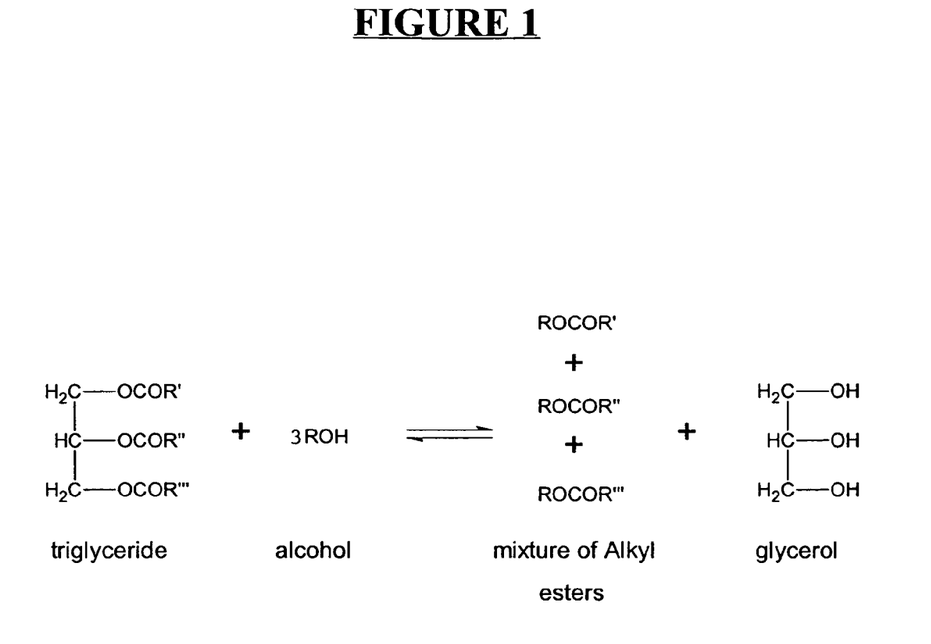
FIG. 1 shows the production of biodiesel using base-catalyzed transesterification, which transforms triglycerides into alkyl esters. As shown in the exemplary equation one mole of triglyceride reacts with three moles of alcohol containing a base to produce three moles of alkyl esters and one mole of glycerol. The triglyceride is converted stepwise to diglyceride, monoglyceride, and glycerol. A mole of ester is liberated in each step. The reactions are reversible, although equilibrium lies far to the right.

Biodiesel can be produced via homogeneous base, acid, and enzyme catalyzed transesterication, and heterogeneous catalyzed processes. Conventionally the production of biodiesel from virgin vegetable oils use base-catalyzed transesterification for the transformation of triglycerides into alkyl esters. FIG. 1 shows that one mole of triglyceride reacts with three moles of alcohol containing a base to produce three moles of alkyl esters and one mole of glycerol. The triglyceride is converted stepwise to diglyceride, monoglyceride, and glycerol. A mole of ester is liberated in each step. The reactions are reversible, although equilibrium lies far to the right. An excess of alcohol is used to increase the yields of the alkyl esters and to allow its phase separation from the glycerol formed. The bases most frequently utilized are sodium or potassium hydroxide. Alcohols such as methanol, ethanol, and iso-propanol have been utilized for producing biodiesel.

Figure 2:
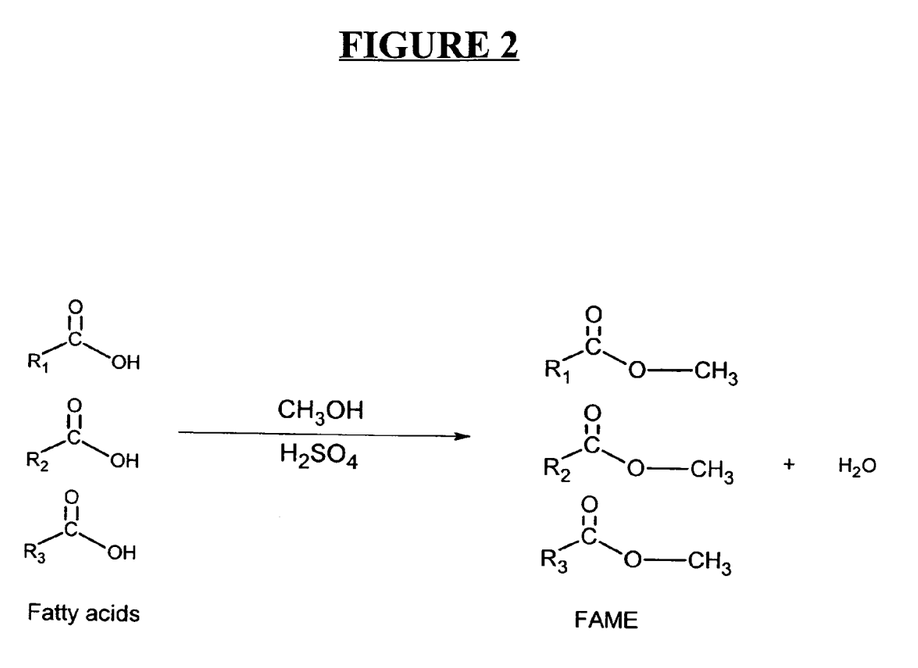
FIG. 2 shows acid catalyzed transesterification of triglycerides. In this reaction the triglycerides are mixed with a mixture of alcohol and an acid (usually sulfuric acid). The kinetics of acid-catalyzed transesterification are slow compared to base catalyzed transesterification. In order to enhance the biodiesel production rate, the reaction is conducted at relatively high temperature (approx. 80° C.) and pressure (approx. 5 atm). The acid catalyzed transesterification reaction also converts the free-fatty acids into alkyl esters.

The same reaction (as shown in FIG. 1) occurs during acid catalyzed transesterification of triglycerides. However, the triglycerides are mixed with a mixture of alcohol and an acid (usually sulfuric acid). The kinetics of acid-catalyzed transesterification are slow compared to base catalyzed transesterification. In order to enhance the biodiesel production rate, the reaction is conducted at relatively high temperature (approximately 80° C.) and pressure (approximately 5 atm). The acid catalyzed transesterification reaction also converts the free-fatty acids into alkyl esters (FIG. 2). The reaction is applied when the oil has a high content of free fatty acids.

Another approach to produce biodiesel from high free fatty acid content oils is to use a hybrid process. In this case transesterification is conducted in two steps; (1) acid catalysis to convert free fatty into alkyl esters, and (2) base catalysis to transform triglycerides, diglycerides, and monoglycerides into alkyl esters.

Figure 3:
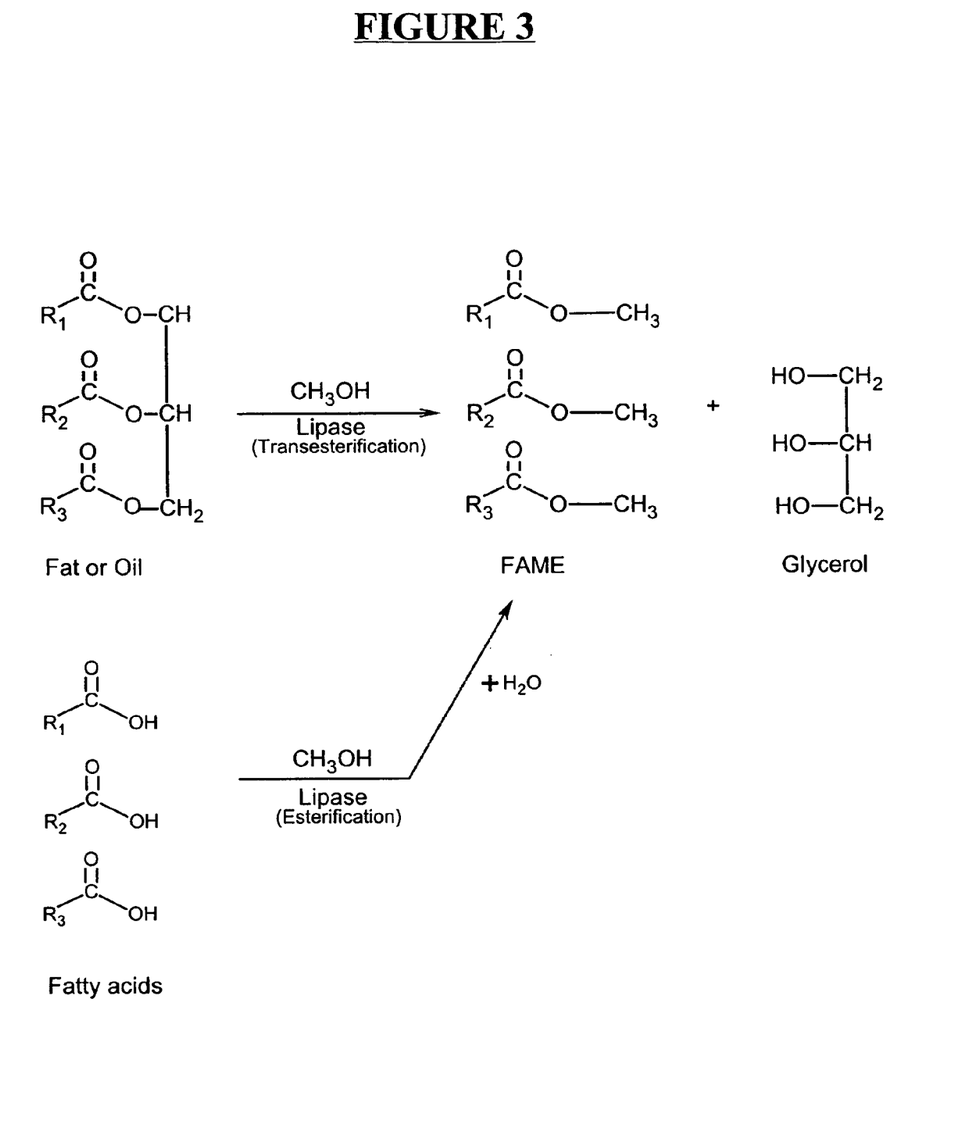
FIG. 3 shows another method that can be applied for producing biodiesel, enzyme (lipase) catalysis. Enzyme catalysis can convert triglycerides and free fatty acids to alkyl esters. This method has not been applied commercially due to slow reaction kinetics and small yields.

Still another method that can be applied for producing biodiesel is enzyme (lipase) catalysis. Enzyme can convert triglycerides and free fatty acids to alkyl esters (FIG. 3). However, this method has not been applied commercially due to slow reaction kinetics and small yields.

Biodiesel production via heterogeneous catalysis involves the application of solid catalysts. Base or acid catalysis can be performed depending on the characteristics of the catalyst (acid or basic). Application of heterogeneous catalysis eliminates biodiesel purification steps. However, this process has not been applied commercially due to issues related with catalyst deactivation.

In addition to using the extracted lipids to produce biodiesel by processes such as those discussed above, the extracted lipids can be added directly to petroleum diesel as a blending agent. The lipids recovered by the process of the present invention can include free oils, fats, greases, triglycerides, diglycerides, phospholipids, and others as disclosed herein.

Following lipid extraction from the dewatered or dewatered and dried sludge, the remaining material will include lipid free proteins, ethanol-phosphate, cellulose acetylglucosine, acetylmuranic acid, ethanolamine and other useful chemicals. These remaining components of the sludge are, like the extracted lipids of considerable commercial value. Particular valuable and unlike other processes for protein recovery is the fact that the proteins recovered from the lipid-extracted remaining sludge are free of lipids and thus more valuable. The addition of acids and bases as is known in the art can facilitate extraction of the proteins from the lipid free residual sludge. Conventionally used methods such as crystallization or acid extraction can be easily employed to extract the lipid free proteins from the remaining sludge material. In contrast to the present invention, conventional protein recovery processes, are technically challenging and expensive due to the presence of lipids with the proteins. Additionally, in conventional processes, the lipids that are present with the protein can impart taste and are often a source of rancid compound formation.

The lipid removal process, which leaves behind the lipid free protein material in the sludge can also effect modifications of the proteins, such as protein unfolding. The lipid free proteins obtained from the processes of the present invention can be used as novel feedstocks for the production of a wide variety of industrial feedstocks, such as polymers.

After lipid extraction and/or the sequential extraction of lipids and proteins, the residual sugars and chemicals in the biosolid can be used and fermented to produce alcohols.

Additionally, after lipid extraction the remaining sludge will be digested much better during the digestion step of a sludge treatment process since lipids tend to hinder the speed and extent of sludge digestion.

A further benefit to drying the sludge, such that the solids are in excess of 30% by weight, and removing the lipids is that the remaining dried sludge (with or without protein and other chemical extraction) can then be used as a feed to a commercial gasifier or combustion system for producing electricity or heat. A related benefit is that the lipid free dried sludge can also be thermally converted into condensable oils or pyrolyzed into biooils.

As indicated above, a principle product that can be produced from the lipids extracted from the process of the present invention is biodiesel fuel. In the production of biodiesel, glycerol is also produced. The produced glycerol also has good commercial value.

The biodiesel produced via the base and/or acid esterification is an economically good use of the lipids, which are extracted from the biologically treated sludges of the invention. However, these lipids can also be used to produce a wide variety of other industrially useful chemicals or, as a fuel, they can be directly blended with petroleum diesel fuels and other fuels (solid and liquid).

The extraction of lipid free proteins from the treated wastewater sludges is another important product that can be obtained from the method of the present invention. Such lipid free proteins can be used to produce many industrial chemicals as well as animal feed. Importantly, removing the lipids makes the residual proteins better, more useful products. The lipid free protein can be concentrated and purified using a variety of techniques including extraction, crystallization, and electro-based separation. This concentrated, purified, lipid free protein can then be used in a wide variety of ways as is well known in the art. With the lipids removed, the residual sludge will avoid odors associated with rancidity of lipids thus improving storage of the product. The product can also be pelletized or processed into another solid geometry and possibly mixed with other protein sources and vitamins for increased nutritional value.

The extracted lipids and the subsequently extracted lipid free proteins are generally the principal products that are obtained by the method of the present invention. More inclusively, the types of chemicals found in the sludges used in the present invention includes: Fats, oils, grease, glycerol, ethanolamine, choline, serine, inositol, n-acetyl glycosamine, purines, pyrimidines, fecal material, proteins, sugars, hopanoids, cholesterols, cellulose, hemicellulose, lignin, alcohols, aromatics, aliphatics, phenols, organic acids, lipids, triglycerides, diglycerides, sphingolipids, fatty acids, glycerolipids, cycloglycerides, sterols, lecithin, esters, tocopherols, cyanolipids, petroleum products are all found in the sludges used as feedstock in the present process.

As discussed above, products of principle importance produced by the present invention include biodiesel (a renewable replacement to petroleum-based diesel), lecithin (a commercial nutrient and processing building chemical typically produced from eggs and soy oil), glycerol (a widely used chemical feedstock in many industrial processes).

In addition to the well known extraction fluids/methods, liquid petroleum fluids can be used as novel extraction fluids for lipids. Examples of such liquid petroleum fluids include diesel fuel, gasoline, light oils, kerosene, and jet fuels to name a few.

Among the many possible chemicals useful as extractants is pyrolysis oils, biooils, and therm-oils, all of which are novel for their use as extractants.

Also produced is a by-product that is much more digestible than typical influents to digestion processes used at wastewater plants. The improved digestibility of the by-product is due to the removal of the lipid fraction. This serves to increase the rate and extent of digestion, resulting in greatly reduced sludge residual volumes that require disposal and an increase in the quality of the resulting digested product.

EXAMPLES

The following is a non-limiting example of the present invention as applied to wastewater sludges produced from a sewage treatment facility. Depending on the water content and type of extraction process utilized, some of the processing steps described below may not be necessary.

Sludge is collected from various sources within the wastewater biological treatment plant. Example sludge sources to be utilized include primary sludge, skimmer residuals, grit, secondary or waste sludge, and biosolids. Locations for removal of these sludges from the sewage plant will vary with the layout of the actual plant; however, in most cases, it is planned that collection after dewatering steps (belt presses, centrifuges, grit chambers, clarification, etc.) will be targeted to reduce the amount of water having to be handling during processing.

Depending on the type of chemical extraction process selected (based on the source of the sludge) and the dewatering effort expended by the wastewater treatment plant, further dewatering may be required. Example processes for dewatering may include centrifuges, filter beds, drying beds, and filter presses. Additionally, drying to 30% solids, preferably 50% solids, and more preferably drying to levels approaching 85% solids may be used if hexane extraction is selected. In this case, spray driers or other commercial drying units may be used to drive off the free water within the sludges.

Chemical extraction (solvent or supercritical) will be used to remove the lipid fraction from the sludges. Examples of such extraction techniques include hexane (or isohexane), ketone extraction, supercritical carbon dioxide extraction, or aliphatic compressed gas extraction (for example: propane, butane or a combination of the two). This processing may also be performed in conjunction with sonification to facilitate improved extraction via the rupturing of microbial cells.

The extracted lipids may require further cleansing to remove solids or other undesirable chemicals entities within the extract, or not, depending on the source of sludge used. After appropriate cleaning of the extracted lipid fraction, the resulting liquid is then processed into biodiesel using the transesterification process. The actual type of transesterification used will depend on the sludge source and localized lipid composition and amount of free fatty acids present in the extract. This processing step will also yield glycerin from the triglycerides present in the sludges at a volumetric yield quantity of 10 parts biodiesel to one part glycerin.

Lecithin may also be extracted from those sludges containing high levels of microorganisms (for example, secondary sludge and biosolids). Lecithin is a health additive and commercial chemical feedstock that is composed primarily of phospholipids that are a major component of microorganisms. When extracting lipids from the microorganism-rich sludges the actual extract is composed primarily of lecithin. This lecithin-rich extract can be further processed into biodiesel or sold directly as lecithin (without conversion into biodiesel). This decision can be dictated by economic considerations of the market value of lecithin as compared to that of biodiesel. For example, if the lecithin market is attractive and would encouraged more production of lecithin, this could result in biodiesel being produced from sludges such as primary sludge, grit, and skimmings, while lecithin could also be produced from secondary sludge and biosolids. While that might be the case if lecithin markets are favorable, it is possible that in an unfavorable lecithin market exist, then biodiesel could be produced from all lipids extracted; that is lipids that could have been used for lecithin would also be converted into biodiesel.

The residuals left over from lipid extraction will be composed primarily of proteins and polysaccharides which are easily digested either anaerobically or aerobically. Depending on plant configuration, this post-extraction fraction can be aerobically digested to product more microorganism cells that can be extracted for lecithin and/or biodiesel production or anaerobically digested where biogas is produced as an in-plant energy source that is produced at rates and to an extent higher than typically achieved with traditional sludge digestion.

If the sludges with high microbial compositions (i.e. secondary and biosolids) are not used for production of lecithin, then the processing of the extracts from these sources will be used to produce biodiesel. During the transesterification of these extracts, ethanolamine will be produced from the glycerin backbone remaining from the phospholipids molecule (the fatty acid component are reacted to form FAMES).

In the present invention prior to recovery of other chemical products, the lipids contained in the sludges must first be extracted.

Lipids are chemically extracted from sludges collected from various wastewater treatment plants to include municipal biological treatment works, confined animal housing wastewater biological treatment works, and industrial biological treatment works. Sludges to be collected and lipids extracted include grit, primary sludge, skimmer sludge, secondary (waste) sludge, manure sludge collected from animal housing under drains, and biosolids. Each of these contain relatively high levels of lipids (from 2% to 40% by weight of dry solids). Lipid extraction from the sludges can be accomplished using chemical extraction as is well known in the art. Some examples of extraction techniques that may be used include hexane, isohexane, ketone, supercritical fluid, and aliphatic gas extraction.

The novel process of the present invention can provide an inexpensive renewable source for a wide variety of products to include, for example:

Biodiesel

The extracted lipid fraction can be used for production of biodiesel using transesterification processes (base, acid, or a combination of both depending on the extent of free fatty acids within the sludge) to form monoalkylesters (biodiesel). Biodiesel is a renewable energy source made from biological sources, such as vegetable oils and animal fats. It can be used in its neat form (100% biodiesel, also known as B100) or in a blend with petroleum diesel. The most common blend is B20, or 20% biodiesel and 80% petroleum diesel. Biodiesel is biodegradable and non-toxic, and does not contribute to global warming. Petroleum diesel, a fossil fuel, releases carbon into the biosphere that has not been there for millions of years, which, along with the burning of other fossil fuels, has raised the level of "greenhouse gases" in the atmosphere significantly. Since the carbon involved in biodiesel is from a biological source, it is already a part of the earth's carbon cycle, and therefore, does not contribute to this greenhouse effect.

Since biodiesel can be operated in almost all diesel engines, it offers an immediate renewable fuel source for displacement of exclusively petroleum-based fuels. The value of this fuel source is becoming well recognized. Either B-100 or B-blends could be used in a wide variety of applications including trucks, heavy equipment, city bus fleets, freight trains, and generators. Research is currently being done regarding several different areas of fuel consumption, including the use of biodiesel for surface as well as airborne transportation by the blending of biodiesel with jet fuels to reduce emissions. For example, the city of Seattle is currently testing biodiesel in 20 of their garbage trucks. Within the automotive business, one of the keys to selling a product is showing the public it is capable of speed. Many alternatively fueled cars are notoriously slow. However, a publicity-oriented automobile called "The Veggie Car" is powered by 100% biodiesel, and capable of speeds up to 120 mph. This proves to the casual consumer that this new fuel does not mean power must be sacrificed in order to help protect the environment. Similar performance and immediate engine compatibility make it convenient for current users of petroleum diesel to switch to something more environmentally friendly. Biodiesel generally sells at the $1.60-$2.75 per gallon price range. The diesel industry represents over $50 billion per year of economic activity within the United States. The U.S. Department of Energy estimates that the total United States annual diesel usage in 2000 was 33 billion gallons. Providing a novel, inexpensive renewable source of biodiesel can serve to expand the use of biodiesel fuel and prompt the development of more biodiesel-powered conveyances. The impact on the economy and the environment could be very significant.

In the production of biodiesel from lipids extracted from wastewater sludges according to the present invention, the lipid or oil (previously extracted prior to production) is reacted with a primary alcohol (often methanol [$CH_3OH$]) and a base (often sodium hydroxide, a.k.a. caustic [NaOH]) to form the fatty acid mono alkyl ester (in this production case, a fatty acid methyl ester which is often referred to as FAME). This production reaction is summarized by the following reaction scheme:

Caustic

Triglyceride+Methanol→Methyl Ester+Glycerol

This reaction is classed as the esterification step (more precisely, a transesterification reaction). On a weight balance basis for the transesterification reaction depicted above, for every 100 pounds of oil/fat and 10 pounds of methanol added, approximately 100 pounds of FAME and 10 pounds of glycerol are produced. Ethanol can be used in place of the methanol, which would form an ethyl, ester instead of the methyl ester produced using methanol. Additionally, other bases can be substituted for the caustic, including potassium hydroxide. It is important to note that free fatty acids present within the triglycerides must be monitored to ensure that excessive soap (produced from the saponification of free fatty acids into soaps) and downstream separation problems are not encountered. Process operations are tailored to specific reagents (chemical composition of the feedstocks and alcohol/base reactants) making continual switching of particularly feedstocks operationally challenging, but not impossible (within reason). Once the glycerol phase is separated, the alcohol is then removed from the biodiesel using distillation or flash evaporation. With most processes, the biodiesel is cleaned using one to several water washes. The glycerol is collected and can be sold as an industrial feedstock to other processes or refined for sale within the pharmaceutical industry. The biodiesel and alcohol are separated allowing recycle of the alcohol within the plant. The biodiesel collected undergoes further processing for cleanup, consisting of water cleanup, distillation, drying, and filtration as is well known in the art.

The selection of the feedstock(s) is likely the most critical process decision to be made due to the fact that feedstock cost typically represent 60-80% of total production costs. Additionally, the long-term availability of the feedstock is another consideration when selecting process reagents. Plus, consideration on how a growing biodiesel market impacts the future cost of the feedstock (and the glycerol) must be taken into account during business and production plan development.

Glycerol

Glycerol (glycerin) can be produced from extracted triglycerides as a by-product of biodiesel production (i.e. base transesterification). Glycerol in its pure form, is a sweet tasting, clear, colorless, odorless, viscous liquid. It is completely soluble in water and alcohols, slightly soluble in many other common solvents and insoluble in hydrocarbons. Until after World War II, nearly all commercial glycerol was produced as a byproduct in the manufacture of soap or from the hydrolysis of fats and oils. Today, substantial amounts of synthetic glycerol are prepared from propylene. Crude glycerol is purified to make various grades, such as dynamite grade, yellow distilled, and chemically pure glycerol. Only the highest grades of glycerol are used in foods and medicines. Glycerol is widely used as a solvent, as a sweetener; in the manufacture of dynamite, cosmetics, liquid soaps, candy, liqueurs, inks, and lubricants. It is also used to keep fabrics pliable, as a component of antifreeze mixtures, as a source of nutrients for fermentation cultures in the production of antibiotics, and in many aspects of medicine. Glycerol can be used as a lubricant in situations where an oil would fail. It is recommended for use in oxygen compressors because it is more resistant to oxidation than mineral oils. Cosmetic, food, and pharmaceutical manufacturers may use glycerol instead of oil for a lubricant, especially if the products come in contact with the lubricant. Glycerol is also used as a humectant in tobacco products. In processing tobacco, glycerol makes up an important part of the casing solution, which is sprayed onto the tobacco before the leaves are shredded and packed. When processing chewing tobacco, glycerol adds sweetness and prevents dehydration. It is also used as a plasticizer in cigarette papers. Separation of glycerol from biodiesel is a relatively simple well-known process in the art. Centrifuging after the reaction is finished or even gravitational settling are both sufficient at accomplishing a good separation, depending on how fast the separation is to be completed and the purity of glycerol desired. Glycerol typically sells for between $0.72 and $1.02 per pound, depending on purity.

Lecithin

Lecithin can be recovered by processes well known in the art from sludges containing high levels of microorganisms, such as secondary sludge or biosolids, that contain elevated levels of phospholipids. Lecithin is used widely in foods as an emulsifier, stabilizer, and antioxidant. Most of the lipid fraction of microorganisms is made up of lecithin and the extraction and purification of lecithin from the extracted lipid faction is accomplished by processes well-known in the art. The key lecithin components of microorganism-based lipids include phospholipids. Lecithin is separated from soybean oil by the addition of water and centrifuging. It is purified prior to use as a food additive. Lecithin typically sells for between $0.50 and $0.52 per pound (CMR, 2003).

Biogas

After lipid removal, the resulting aqueous solution is highly digestible within either anaerobic or aerobic digesters. Anaerobic digestion of this solution will yield high quality biogas due to increased rate and extent of methane production as compared to traditional digestion processes treating sludges with nominal lipid contents. Aerobic digestion results in the production of more aerobic microbial cells at a faster rate (due to the removal of the lipids) which can be extracted to produce more lipids for either biodiesel or lecithin production. Additionally, the extracted lipids will eliminate or greatly reduce the foaming within aerobic digesters. This gaseous product, produced during the anaerobic digestion of organic products, is typically composed of 40%-60% methane with the balance primarily made up of carbon dioxide. Within the wastewater treatment business (and the purposes of this invention), biogas is most often associated with the digestion of waste solids within anaerobic digesters. Biogas generally has a value within the $2 to $8 per thousand cubic feet of gas market value.

Ethanolamine

Ethanolamine can be produced, along with glycerin, from the extracts collected from lipid rich sludges containing high levels of microorganisms. As is well known in the art, ethanolamine can be captured from the breakdown of the phospholipids as they are processed during transesterification. This product is used in the production of detergents, gas purification, herbicides, ethanolamines, and emulsifiers. Currently, it is being manufactured through the reaction of ethylene oxides with aqueous ammonia. Total worldwide production capacity is approximately 350 million pounds per year. The amount of ethanolamine that can be produced from the invention is approximately 500 million pounds per year. Currently, the cost of ethanolamine is approximately $0.60 per pound.

After the initial extraction of lipids and possibly proteins and other useful chemicals from the solids and sludges processed by the method of the present invention, the remaining solid material can be further processed.

The resulting residuals obtained from the process of the present invention are much lower in quantities of sludge to be disposed, while at the same time producing sludge that meets USEPA's Class A biosolids criteria. These sludges can be classified as Class A or any beneficial-use sludge biosolids because the pathogens originally present in the sludge are destroyed or inactivated by the aggressive treatment of the material under the processing steps described above. Biosolids converted to Class A or any beneficial-use sludge biosolids by the process of the present invention will store much better than conventional biosolid residuals due to the increased stability and significant odor minimization. These biosolids can be used to make excellent solid fuels for combustion in industrial uses such as power or heat production.

It is possible to include a process for the further improvement of the processing characteristics of biosolids and for further deactivation of potential pathogens. In addition, the biosolids can be composted and/or treated by any other process that is known for the treatment of sludge, such as, for example the use of pH modifiers (bases), exothermic reactants (bases), gamma rays, and the like. Such further treated biosolids still contain lipids, which by the process of the present invention can be extracted for further industrial and commercial uses. The value of the sludges for the extracted lipids and the much more stable product that results from the treatment of the biosolids further sets the present invention apart from conventional processes.

At any point in the processing of the biosolids or other sludges obtained after lipid extraction using the process of the present invention, the biosolids can be used as a fertilizer or soil amendment of agricultural benefit product. A lipid free fertilizer or soil amendment of agricultural benefit product would have considerable benefit over other fertilizer products derived from sewage in that the lipids, which are the cause of odor production, will not be present in the remnant material.

All references cited with this application are herein fully incorporated by reference. Variations, modifications, and additions to this invention will be readily apparent to one skilled in the art and such modifications and additions would be fully within the scope of the invention, which is limited only by the following claims.

REFERENCES 1. http:/www.lipidlibrary.co.uk/mainlip.html
2. Introduction to Organic and Biological Chemistry—Third Edition by Braun (1982), Macmillian Pub., New York, N.Y., ISBN: 0-02-306640-7.
3. The Industrial Wastewater Systems Handbook by R. Stephenson and J. Blackwell, Jr., 1998, CRC Press LLC, Boca Raton, Fla., ISBN No. 1-56670-209-7.
4. Anaerobic Biotechnology for Industrial Wastewaters by Speece (1996), Archae Press, Nashville, Tenn., ISBM: 0-9650226-0-9.
5. Wastewater Engineering: Treatment, Disposal, and Reuse—Third Edition by Metcalf and Eddy, 1991, McGraw-Hill Inc., New York, N.Y., ISBN: 0-07-041690-7.
6. Unit Operations and Processes in Environmental Engineering by Reynolds and Richards (1996), PWS Publishing Company, Boston, Mass., ISBN: 0-534-94884-7.
7. Water Supply and Sewerage by Steel and McGhee (1979), McGraw Hill, New York, N.Y., ISBN: 0-07-060929-2.
8. Water and Wastewater Technology by Hammer and Hammer (1996), Prentice-Hall, Englewoods Cliff, N.J., ISBN: 0-13-205626-7.
9. Environmental Engineering: A Design Approach by Sincero and Sincero (1996), Prentice-Hall, Englewoods Cliff, N.J., ISBN: 0-02-410564-3.
10. "A Conceptual Basis for Microbial Selection in Biological Wastewater Treatment" by Pretorius (1987), Water Research Journal, V21, pp. 891-894.
11. "Dems Urge New Ship Sewage Limits" by Geiselman (2004), Waste News, Apr. 12, 2004.
12. Manual on Solving Activated Sludge Bulking, Foaming, and Other Solids Separation Problems—Third Edition by Jenkins, Richard, and Daigger (2003), Lewis Pub., Baco Raton, FA., ISBN: 1-5667-0647-5.
13. Anaerobic Biotechnology for Industrial Wastewaters by Speece (1996), Archae Press, Nashville, Tenn., ISBM: 0-9650226-0-9.
14. Wastewater Engineering: Treatment, Disposal, and Reuse—Third Edition by Metcalf and Eddy, 1991, McGraw-Hill Inc., New York, N.Y., ISBN: 0-07-041690-7
15. "Study of COD and BOD Changes During Anaerobic Digestion of Human Excreta in a Biogas Plant" by Shekhar, Kumar, and Mazumdar (1991), Indian Journal of Environmental Protection (V11, N5 [May]).
16. Biosolids Technology Fact Sheet by USEPA, Report No. EPA-832-F-00-057, USEPA Office of Water, Washington D.C.
17. Biosolids Generation, Use, and Disposal in the United States by the USEPA (1999), Report No. EPA/530-R-99-009, Office of Solid Waste and Emergency Response, Washington D.C.
18. "Fish Oil and Cod Liver Oil (EPA and DHA)" by Vitamin Guide (2003), http:/www.mycustompak.com/health-Notes/Supp/Fish_Oil.htm.
19. "Lecithin" found on http://msdlocal.ebi.ac.uk/does/chem_comp/data/het6011.html.
20. "What is an Anaerobic Digestor?" by Henry and Koelsch (2004), Manure Matters Newsletter (V7, N10), University of Nebraska Extension Service, Lincoln, Nebr.
21. "Design and Operation of Livestock Waste Lagoons" by Jones and Sutton (2003), Purdue University Cooperative Extension Service, West Lafayette, Ind.
22. "Manure and Waste Handling" by Popendorf (2003), http:/turva.me.tut.fi/iloagri/stock/8.htm
23. "Methane Fuel Gas from Livestock Wastes: A Summary" by Barker (2003), North Carolina Cooperative Extension Service, Raleigh, N.C., Publication No. EBAE 071-80.
24. Biological Manipulation of Manure: Getting What You Want from Animal Manure" by Leggett, Lanyon, and Graves (1996), Penn State Agricultural and Biological Engineering Extension Service, University Park, Pa.
25. "Liquid Manure Management" by Davis, Andrews, and Al-Kaisi (2004), Colorado State University Cooperative Extension Service, No. 1.221, Ft. Collins, Colo.
26. "Reduce Environmental Problems with Proper Land Application of Animal Manure" by Fulhage (2000), MU Extension Service, Report No. EQ 201, University of Missouri-Columbia.
27. "Handling Manure a Chore Unto Itself" by Johnson (2003), Waste News, Sep., 29, 2003.
28. Methane Recovery from Animal Manures: The Current Opportunities Casebook by Lusk (1998), US Dept. of Energy, Report No. NREL/SR-580-25145, National Renewable Energy Laboratory, Golden, Co.
29. "Solexol Fractional of Menhaden Oil" by Dickinson and Meyers (1952), The Journal of the American Oil Chemists' Society, V29, N6.
30. "Supercritical Fluid Extraction and Chemicals from Biomass with Supercritical Fluids" by Demirbas (2001), Energy Conversion and Management, V42, pp. 279-294.
31. "Mathematical Modeling of Sunflower Seed Extraction by Supercritical Carbon Dioxide" by Perrut, Clavier, Poletto, and Reverchon (1997), Industrial Engineering Chemical Research, V36, pp. 430-435.
32. Separation Process Principals by Seader and Henley (1998), John Wiley and Sons, New York, N.Y., ISBN: 0-471-58626-9.
33. A Citizen's Guide to Solvent Extraction by USEPA (1996), Report No. EPA-542-F-96-003, Office of Solid Waste and Emergency Response, Washington D.C.
34. "Soybean Oil" by Semon, Patterson, Wybomey, Blumfield, and Tageant (2004), http:/www.wsu.wdu/~gmhyde/433_web_pages/433Oil-web-pages/Soy/soybean1.html.
35. "Oilseed Extraction—Rapeseed Oil" by Perry, Roche, Sherley, and Tiede (2003), http:/www.wsu.edu/~gmhyde/433_web_pages/433Oil-web-pages/rapeseed 2/rape-canola-oil.html.
36. "Extraction of Grape Seed Oil by Supercritical Carbon Dioxide and Ethanol Modifier" by Lee, Chu, Oh, Park, Cha, Jung, and Chol (2000), Journal of Food Science and Biotechnology, V9, pp. 174-178.

37. U.S. Pat. No. 5,707,673 (Prevost et al., Jan., 13, 1998)—Process for Extracting Lipids and Organics from Animal and Plant Matter or Organics-Containing Waste Streams
38. "Standard Specification for Biodiesel Fuel (B100) Blend Stock for Distillate Fuels" by ASTM, Spec. No. ASTM D 6751-02, ASTM, West Conshohocken, Pa.
39. From the Fryer to the Tank: The Complete Guide to Using Vegetable Oil as an Alternative Fuel by Tickell (2003), Joshua Tickwell Media Productions, New Orleans, La., ISBN: 0-9707227-0-2.
40. Renewable Biological System for Alternative Sustainable Energy Production by United Nations (1997), Report No. FAO-128, Agricultural Services Bulletin, United Nations, Rome, Italy.
41. A Review of the Engineering Aspects of the Biodiesel Industry by Zappi, Hernandez, Sparks, Horne, and Brough, Environmental Technology Research and Applications Laboratory, MSU ETECH Report No. ET-03-003, Dave C. Swalm School of Chemical Engineering, Mississippi State University, Starkville, Miss.
42. "Designing Diesels for the Next Decade" by Korane (2003), Machine Design, Sep. 18, 2003.
43. Liquid Filtration—Second Edition by Cheremisinoff (1998), BH Publishing, Boston, Mass., ISBN: 0-7506-7047-9.
44. Separation Process Principals by Seader and Henley (1998), John Wiley and Sons, New York, N.Y., ISBN: 0-471-58626-9.
45. Wastewater Engineering: Treatment, Disposal, and Reuse—Third Edition by Metcalf and Eddy, 1991, McGraw-Hill Inc., New York, N.Y., ISBN: 0-07-041690-7
46. "Spray Drying" by Mermestein (2001), Food Technology, April 2001, V55, N4.
47. "Changing World Technologies Wants to Burn Turkey Waste for Energy" by Bergstrom (2003), Mindfully.org Notes, http:/www.mindfully.org/Air/2003/Burn-Turkey-Waste-Energy16may03.htm.
48. Gasification by Higman and van der Burgt (2003), Elsevier Pub., Boston, Miss., ISBM: 0-7506-7707-4.

What is claimed is:

1. A method for producing a lipid-rich feedstock from the lipids contained in microorganisms of secondary sludge generated during wastewater treatment operations, the method comprising:
   providing a secondary sludge comprised of microorganisms, wherein the sludge is from a wastewater treatment facility;
   dewatering said secondary sludge to produce a dewatered sludge; and
   chemically extracting microbial lipids from said dewatered sludge to produce a lipid-rich component and a sludge remnant component.

2. The method of claim 1, wherein said lipid-rich component comprises free lipids and chemically bonded lipids.

3. The method of claim 1, wherein said secondary sludge is biologically treated sludge.

4. The method of claim 1, wherein said dewatered sludge comprises a solids content of 5% or greater.

5. The method of claim 1, wherein said lipids extracting step uses at least two extractants selected from the group consisting of supercritical fluids with co-solvents, supercritical fluids without co-solvents, hexane, acetone, liquid petroleum products, mixtures of fatty acid alkyl esters, and primary alcohols to extract both polar and non-polar lipids from the sludge.

6. The method of claim 5, wherein said extractant is liquid petroleum products, said liquid petroleum products comprising at least one member selected from the group consisting of diesel fuel, gasoline, biooils, and pyrolysis oils.

7. The method of claim 1, further comprising extracting proteins from said sludge remnant component to produce a protein component and a final sludge component.

8. The method of claim 7, wherein said extracted proteins are substantially lipid free.

9. The method of claim 7, further comprising:
   providing said final sludge component as a fuel source to a commercial gasifier or combustion system for industrial power, heat generation, electrical power, or synthesis gas.

10. The method of claim 7, wherein said final sludge component is a Class A or any beneficial-use sludge.

11. The method of claim 10, further comprising the step of providing additives to said Class A or any beneficial-use sludge, said additives being selected from the group consisting of proteins, minerals, vitamins, and combinations thereof.

12. The method of claim 1, further comprising the step of oxidative processing of said secondary sludge to change the degree of saturation of lipids contained in said secondary sludge.

13. The method of claim 12, wherein said oxidative processing comprises at least one treatment process selected from the group consisting of ozonation, peroxone oxidation, and use of Fenton's Reagent.

14. The method of claim 1, wherein the secondary sludge comprises wastewater sludge selected from the group consisting of secondary wastewater sludge, tertiary wastewater sludge, biosolid sludge, and combinations thereof.

15. The method of claim 1, wherein the sludge is from a biological treatment system.

* * * * *